(12) United States Patent
Boehm et al.

(10) Patent No.: US 10,988,074 B2
(45) Date of Patent: *Apr. 27, 2021

(54) METHOD FOR DETERMINING CONTROL PARAMETERS FOR LIGHT SOURCES OF A VEHICLE HEADLAMP

(71) Applicant: DAIMLER AG, Stuttgart (DE)

(72) Inventors: Jan Boehm, Grafenau (DE); Marcus Fiege, Stuttgart (DE); Stephan Finn, Böblingen (DE); Stephan Frey, Filderstadt (DE); Joerg Moisel, Neu-Ulm (DE); Axel Mueller, Schorndorf (DE); Volker Reinhold, Herrenberg (DE); Katharina Wagner, Böblingen (DE)

(73) Assignee: DAIMLER AG, Stuttgart (DE)

( * ) Notice: Subject to any disclaimer, the term of this patent is extended or adjusted under 35 U.S.C. 154(b) by 223 days.

This patent is subject to a terminal disclaimer.

(21) Appl. No.: 16/322,747

(22) PCT Filed: Jul. 28, 2017

(86) PCT No.: PCT/EP2017/000920
§ 371 (c)(1),
(2) Date: Feb. 1, 2019

(87) PCT Pub. No.: WO2018/024367
PCT Pub. Date: Feb. 8, 2018

(65) Prior Publication Data
US 2020/0164790 A1 May 28, 2020

(30) Foreign Application Priority Data
Aug. 3, 2016 (DE) .................... 10 2016 009 459.1

(51) Int. Cl.
*B60Q 1/076* (2006.01)
*F21S 41/657* (2018.01)

(52) U.S. Cl.
CPC ............ *B60Q 1/076* (2013.01); *F21S 41/657* (2018.01); *B60Q 2300/21* (2013.01); *B60Q 2300/32* (2013.01)

(58) Field of Classification Search
CPC ........ B60Q 1/076; B60Q 1/08; F21Y 2115/10
See application file for complete search history.

(56) References Cited

U.S. PATENT DOCUMENTS 6,861,809 B2 * 3/2005 Stam ..................... F21S 41/698
                                                          315/82
7,526,103 B2 * 4/2009 Schofield ........... G06K 9/00818
                                                          382/104

(Continued)

FOREIGN PATENT DOCUMENTS

DE    102008001551 A1    11/2009
DE    102008029159 A1    12/2009

(Continued)

OTHER PUBLICATIONS

International Search Report dated Dec. 7, 2017 in corresponding/related International Application No. PCT/EP2017/000920.

(Continued)

*Primary Examiner* — Robert J May
(74) *Attorney, Agent, or Firm* — Patent Portfolio Builders PLLC (57) ABSTRACT

A method and a device for adjusting a light distribution of a vehicle headlight having a control unit for adjusting the light distribution. The headlight includes a number of light sources. The control unit includes an interface configured for receiving user-specified parameters for adjusting and/or modifying an illuminance distribution within the light distribution.

19 Claims, 4 Drawing Sheets

(56) References Cited

U.S. PATENT DOCUMENTS

| | | | |
|---|---|---|---|
| 9,227,555 B2* | 1/2016 | Kalapodas | B60Q 1/04 |
| 9,381,851 B2 | 7/2016 | Niemz | |
| 10,696,208 B2* | 6/2020 | Moisei | B60Q 1/085 |
| 2005/0111231 A1 | 5/2005 | Crodian et al. | |
| 2015/0285458 A1 | 10/2015 | Dassanayake et al. | |
| 2017/0166108 A1* | 6/2017 | Warren | B60Q 1/076 |

FOREIGN PATENT DOCUMENTS

| | | |
|---|---|---|
| DE | 202011003404 U1 | 6/2011 |
| DE | 102012022282 A1 | 5/2014 |
| DE | 102013016904 A1 | 7/2014 |
| DE | 102013021941 A1 | 7/2015 |
| DE | 102014225246 A1 | 7/2015 |
| DE | 102015205266 A1 | 10/2015 |
| WO | 2015090516 A1 | 6/2015 |

OTHER PUBLICATIONS

Search Report dated May 30, 2017 in corresponding/related DE Application No. 10 2016 009 459.1.
Written Opinion dated Dec. 7, 2017 in corresponding/related International Application No. PCT/EP2017/000920.

* cited by examiner

METHOD FOR DETERMINING CONTROL PARAMETERS FOR LIGHT SOURCES OF A VEHICLE HEADLAMP

BACKGROUND AND SUMMARY OF THE INVENTION

Exemplary embodiment of the invention relate to a method for adjusting a light distribution of a headlight, a device for adjusting a light distribution of a headlight, a method for determining control parameters for light sources of a vehicle headlight, and a method for controlling light sources of a vehicle headlight. The method for determining control parameters can involve detecting the control parameters that are used in the method and device for adjusting a light distribution. The method for controlling light sources makes use of the technical teaching of the method for adjusting a light distribution and implements the method for adjusting light distribution in the vehicle. In particular, the method for controlling light sources makes it possible to carry out the method for adjusting a light distribution by taking into consideration the specific properties of the headlight installed in the vehicle. In addition, exemplary embodiments of the invention relate to a vehicle headlight system. In one embodiment, the vehicle headlight system refers to the device for adjusting a light distribution and takes into consideration the fact that a plurality of headlights are typically installed in a vehicle. In another embodiment, the vehicle headlight system detects the control parameters for a device for adjusting a light distribution for specific headlight types or specific headlight designs.

Methods for determining control parameters for light sources of a vehicle headlight, in particular of a so-called pixel headlight, are generally known from the prior art. A pixel headlight of this kind comprises a plurality of light sources arranged in an array, for example LEDs, which can be actuated individually or in groups to produce a light distribution. This actuation is carried out by means of control parameters that are manually set for each light source or group of light sources for different light distributions and driving situations.

DE 10 2014 225 246 A1 discloses a lighting device for a vehicle, the lighting device comprises a light deflection unit having two light deflection elements that can be electronically activated independently of one another and can be adjusted in their spatial orientation by actuation. In a first actuation position, the light deflection elements are designed to deflect light that hits them in a direction that has been predetermined by their spatial orientation, as a result of which a first, variable light image can be provided by means of a variable and adjustable light distribution. The lighting device further comprises a light source by means of which light can be radiated into the light deflection unit, the lighting device further comprising a light-shaping element and at least one light deflection element being designed, in a second actuation position, to deflect light into the light-shaping element. The light-shaping element is designed to provide the same radiated light as a second light image having constant light distribution, light that is radiated into the light deflection unit from the light source being used completely for providing the first and second light images at any time. Moreover, a method for controlling a lighting device of this kind is described in which the first light image is provided during a first time interval. The light of the light source that is not required for providing the first light image is used for providing the second light image during the first time interval. The first light image then ceases to be provided and the second light image is provided by the same light of the light source during a second time interval.

Furthermore, a vehicle headlight system having a vehicle headlight is known from DE 10 2015 205 266 A1, which vehicle headlight comprises a reflective element and a light source. The reflective element comprises an array of selectively controllable portions, the light source providing a first output to the reflective element. Furthermore, the vehicle headlight system comprises a computer coupled to the light source and the reflective element, the computer selectively operating the portions of the reflective element in order to form the first output in the illumination regions according to a vehicle user characteristic.

Exemplary embodiments of the invention are directed to an improved method and device for adjusting a light distribution of a headlight. Furthermore, exemplary embodiments of the invention are directed to an improved method for determining control parameters for light sources of a vehicle headlight, a method for controlling light sources of a vehicle headlight, and a vehicle headlight system comprising the devices according to the invention. Finally, a vehicle headlight system is also specified by means of which the necessary control parameters are detected e.g., by the method for detecting the control parameters. The different methods and devices and vehicle headlight systems have in common the inventive teaching of making the light distributions of headlights individually adjustable by the user.

In the method for adjusting a light distribution of a headlight, in particular of a vehicle headlight, having a plurality of light sources, an illuminance distribution within the light distribution is modified according to the invention on the basis of parameters specified by user specification. This particularly advantageously makes it possible for a user of a vehicle to adapt the light distribution produced by the headlight to the user's needs, which significantly increases road safety and comfort for the user.

According to one possible aspect of the method, the parameters can be specified and/or modified by user specification during operation of the headlight. This "online specification" makes it possible for the user to immediately detect effects of changes of the parameters in the generated light distribution. Moreover, this allows an intuitive way of adjusting and modifying the parameters.

Alternatively, or additionally, in a possible embodiment of the method, the light distribution is simulated on the screen and the user specifies parameters for adjusting the illuminance distribution in the simulation. This embodiment allows the user to easily modify and specify the parameters and allows easy traceability for the user even in bright environmental conditions in which the user does not see the produced light distribution, or sees it only insufficiently, on the road surface.

In an embodiment of the method, light intensities of individual light sources or groups of light sources are modified based on the parameters. By actuating individual light sources or groups of light sources, a plurality of light distributions having different illuminance distributions can be produced in a simple manner.

The device for adjusting a light distribution of a headlight, in particular of a vehicle headlight, comprises at least one control unit for adjusting the light distribution, the headlight comprising a plurality of light sources. According to the invention, the control unit comprises an interface, the interface being configured for transmitting parameters specified by user specification to the control unit and the parameters being provided for adjusting and/or modifying an illuminance distribution within the light distribution.

The interface, also referred to as a human-machine interface, allows the user to specify the parameters for adjusting and/or modifying an illuminance distribution.

In particular, an input device is coupled to the interface, by means of which device the user can specify the parameters.

For example, the input device is a touch-sensitive screen on which the light distribution to be produced is displayed. In this case, the user can, for example, first select a region of the light distribution to be adapted and then adjust the illuminance desired by the user.

Alternatively, or additionally, the input device comprises a combined turn-press-pull-push switch, by means of which the user can navigate a marker on a screen showing the light distribution and can input the desired illuminance. It is also possible that a marker projected into the real light distribution can be moved by means of the input device, so that the user can adjust the lighting intensity "online" and therefore so as to be easily traceable in the produced light distribution.

In another possible embodiment of the device, the input device is a mobile terminal, for example a so-called smartphone or tablet PC, via the operating interface of which the user specifies the desired illuminance.

In the method for determining control parameters for light sources of a vehicle headlight, at least one light distribution to be produced by means of a vehicle headlight is detected.

According to the invention, the light data describing the light distribution are produced and an overall target light intensity of all the light sources and an individual target light intensity for each individual, in particular available, light source are detected based on the light data and based on geometric and optical properties of the light sources. The individual target light intensities are fed to a control unit of the vehicle headlight, control parameters being detected by means of the control unit on the basis of the individual target light intensities and stored headlight data, describing geometric and optical properties, of the vehicle headlight for each light source of the vehicle headlight, such that the vehicle headlight produces the light distribution described by means of the light data.

The light distribution is detected universally and irrespective of design, type and geometric and optical properties of the vehicle headlight. These conditions, in combination with determining the control parameters by means of the control unit of the vehicle headlight in the vehicle, particularly advantageously have the result that the light distribution, i.e., the light data, needs to be produced as target values only once and actually determining the control parameters can be carried out in the vehicle itself. This significantly lowers the effort involved in parameterizing the vehicle headlight and reduces it to a formal description of the light sources, i.e., the design, the type and the geometric and optical properties of the vehicle headlight. It is not necessary to manually set the control parameters for each individual light source of the vehicle headlight.

Switch-on times, switch-off times and/or brightness values for the light sources in particular are specified by means of the control parameters.

In a possible aspect of the method, pulse width modulation parameters are determined as control parameters in order to allow control of light sources, which comprise LEDs or are composed thereof. It is therefore also possible, for example, to use the method to control so-called pixel headlights having a plurality of LEDs arranged in a so-called LED array, the reduction in effort being particularly high with regard to parameterizing the vehicle headlight due to the one-time production of the light data as target values and to determining the control parameters by means of the control unit of the vehicle headlight in the vehicle itself when there is such a large number of light sources.

In another possible embodiment of the method, properties of the vehicle surroundings and/or of a road surface are taken into consideration when the control parameters are determined. This makes it possible for illumination that is constantly adapted to the environmental conditions of the vehicle to be produced by means of the vehicle headlight.

In a possible development of the method, the properties of the vehicle surroundings and/or of a road surface are detected by means of at least one on-board sensor. The environmental conditions of the vehicle can therefore always be detected reliably and in real-time.

In the method for controlling light sources of a vehicle headlight, control parameters are detected according to the invention by means of a control unit of the vehicle headlight on the basis of individual target light intensities, by means of which a light distribution to be produced by means of the vehicle headlight is produced, for each individual light source of the vehicle headlight determined from light data of a light distribution to be produced and from geometric and optical properties of the light sources and on the basis of stored headlight data, describing geometric and optical properties of the vehicle headlight, for each light source of the vehicle headlight, such that the vehicle headlight produces the light distribution described by means of the light data.

The light distribution is detected universally and irrespective of design, type, and geometric and optical properties of the vehicle headlight. These conditions, in combination with determining the control parameters by means of the control unit of the vehicle headlight in the vehicle, particularly advantageously have the result that the light distribution, i.e., the light data, needs to be produced as target values only once and actually determining the control parameters can be carried out in the vehicle itself. This significantly lowers the effort involved in parameterizing the vehicle headlight and controlling the headlight and reduces it to a formal description of the light sources, i.e., the design, the type, and the geometric and optical properties of the vehicle headlight. It is also possible, due to the determination of the control parameters in the vehicle itself, that the parameters can always be variably adapted to varying conditions, for example varying environmental conditions.

In a possible development of the method, pulse width modulation parameters are determined as control parameters in order to allow control of light sources which comprise LEDs or are composed thereof. It is therefore also possible, for example, to use the method to control so-called pixel headlights having a plurality of LEDs arranged in a so-called LED array, the reduction in effort being particularly high with regard to parameterizing the vehicle headlight due to the one-time production of the light data as target values and to determining the control parameters by means of the control unit of the vehicle headlight in the vehicle itself when there is such a large number of light sources.

According to a possible embodiment of the method, properties of the vehicle surroundings and/or of a road surface are taken into consideration when the control parameters are determined. This makes it possible for illumination that is constantly adapted to the environmental conditions of the vehicle to be produced by means of the vehicle headlight.

In a possible development of the method, the properties of the vehicle surroundings and/or of a road surface are detected by means of at least one on-board sensor. The environmental conditions of the vehicle can therefore always be detected reliably and in real-time.

A first possible embodiment of the vehicle headlight system comprises at least one vehicle headlight, having a plurality of light sources and at least one control unit for controlling the vehicle headlight and, according to the invention, a device for adjusting a light distribution of a headlight based on parameters specified in user specification. This particularly advantageously makes it possible for the user of a vehicle to adapt the light distribution produced by the vehicle headlights to the user's needs. This significantly increases road safety and comfort for the user. A vehicle typically has a plurality of front headlights, e.g., 2 to 4 headlights. The device according to one aspect of the invention can be used in each individual headlight, although the overall light distribution of all the headlights can advantageously be adjusted by the device.

An embodiment of the vehicle headlight system is used to detect the control parameters for the related methods and devices of this invention. It comprises at least one vehicle headlight having a plurality of light sources and at least one control unit for controlling the vehicle headlight. According to the invention, the control unit is configured to detect control parameters and to actuate the light sources by means of the control parameters, on the basis of individual target light intensities, by means of which a light distribution to be produced by means of the vehicle headlight can be produced, for each individual light source of the vehicle headlight determined from light data of a light distribution to be produced and from geometric and optical properties of the light sources and on the basis of stored headlight data, describing geometric and optical properties of the vehicle headlight, for each light source of the vehicle headlight, such that said light sources produce the light distribution described by means of the light data.

In this case, the vehicle headlight system and the design of the control unit make it possible for the light distribution to be detected universally and irrespective of design, type and geometric and optical properties of the vehicle headlight. These conditions, in combination with determining the control parameters by means of the control unit, particularly advantageously have the result that the light distribution, i.e., the light data, needs to be produced as target values only once and actually determining the control parameters can be carried out in the vehicle itself. This significantly lowers the effort involved in parameterizing the vehicle headlight and reduces it to a formal description of the light sources, i.e., the design, the type and the geometric and optical properties of the vehicle headlight.

In a possible embodiment of the vehicle headlight system, the light sources comprise LEDs. Light distributions with lower energy consumption, in comparison to conventional lighting means, such as light bulbs or gas discharge lamps, can be produced by means of LEDs. Moreover, LEDs can be actuated easily and reliably by means of a pulse width modulation.

In another possible embodiment of the vehicle headlight system, the light sources can be actuated individually or in groups. Different light distributions can therefore be produced in a simple manner.

In a possible development of the vehicle headlight system, a plurality of light sources are arranged adjacently or one above the other, in particular in a so-called array. This makes it possible to implement different light distributions, in particular even complex light distributions, and light controls.

BRIEF DESCRIPTION OF THE DRAWING FIGURES

Embodiments of the invention are explained in greater detail below with reference to the drawings, in which.

Parts which correspond to one another are provided with the same reference signs in all the drawings.

DETAILED DESCRIPTION

Figure 1:
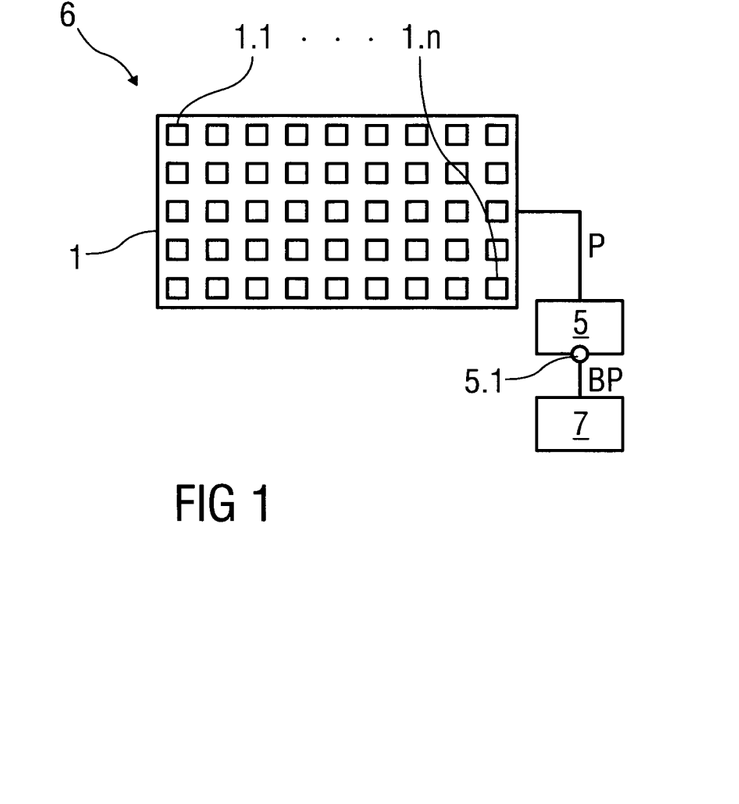
FIG. 1 is a schematic view of a block diagram of a device for adjusting a light distribution of a vehicle headlight.

FIG. 1 is a block diagram of a possible embodiment of a device 6 according to the invention for adjusting a light distribution LV of a vehicle headlight 1.

In the embodiment shown, the vehicle headlight 1 is designed as a so-called LED headlight and comprises a plurality of light sources 1.1 to 1.n arranged adjacently and one above the other in a so-called array, which light sources are designed as LEDs. In embodiments not shown in more detail, the light sources 1.1 to 1.n can alternatively or additionally also comprise other types of light sources, such as lightbulbs, laser light sources and/or gas discharge lamps. The light sources 1.1 to 1.n can be actuated individually or in groups, irrespective of their design.

Users of a vehicle have different preferences as to how an illuminance distribution of the light distribution LV produced by the vehicle headlight 1 can be designed.

For this reason, a control unit 5 provided for actuating the light sources 1.1 to 1.n comprises an interface 5.1 on the basis of which parameters BP, i.e., lighting intensity parameters, stored inside the control unit 5 can be changed or fed to the control unit.

For this purpose, an input device 7 is coupled to the interface 5.1, on the basis of which input device the user can adjust or change the user's desired illuminance distribution within the light distribution LV.

For example, the input device 7 is a touch-sensitive screen, which displays the light distribution LV to be produced. In this case, the screen is preferably provided for further applications in the vehicle, for example for outputting information regarding a navigation device or an entertainment system. Here, the user can, for example, first select a region of the light distribution LV to be adjusted and then adjust the lighting intensity desired by said user.

Alternatively, or additionally, the input device 7 comprises a combined turn-press-pull-push switch, by means of which the user can navigate a marker on a screen which shows the light distribution LV and can input the desired illuminance for different positions. It is also possible that a marking projected into the real light distribution LV can be moved by means of the input device 7, such that the user can adjust the illuminance "online" and thus so as to be highly traceable in the produced light distribution LV.

In another possible embodiment, the input device 7 is a mobile terminal, for example a so-called smartphone or a tablet PC, via the operating interface of which the user specifies the desired illuminance. For this purpose, the interface 5.1 is designed in particular as a wireless interface, for example as a radio interface.

For all the described embodiments of the input device 7 and specification of the parameters BP, the parameters can be input by user specification during operation of the vehicle headlight 1, such that the user can immediately detect effects of changes to the parameters BP in the produced light distribution LV.

Alternatively, or additionally, it is possible to simulate the light distribution LV to be produced on the screen and to adapt the illuminance distribution on the screen. As a result, it is possible for the user to specify a desired illuminance distribution even in bright environmental conditions in which the user cannot, or can only insufficiently, see the produced light distribution LV on a road surface.

Depending on the parameters BP selected by the user, the control unit 5 actuates the light sources 1.1 to 1.$n$ of the vehicle headlight 1 individually or in groups by means of control parameters P, such that the light distribution LV desired by the user can be produced having the selected illuminance distribution.

In particular, the user can create light distributions LV completely independently or adjust pre-set light distributions LV according to said user's wishes.

In order to prevent the user himself and other road users from being dazzled, limiting values are specified for, in particular, a produced light range, light width, and illuminance that cannot be exceeded by specification of the parameters BP.

Figure 2:
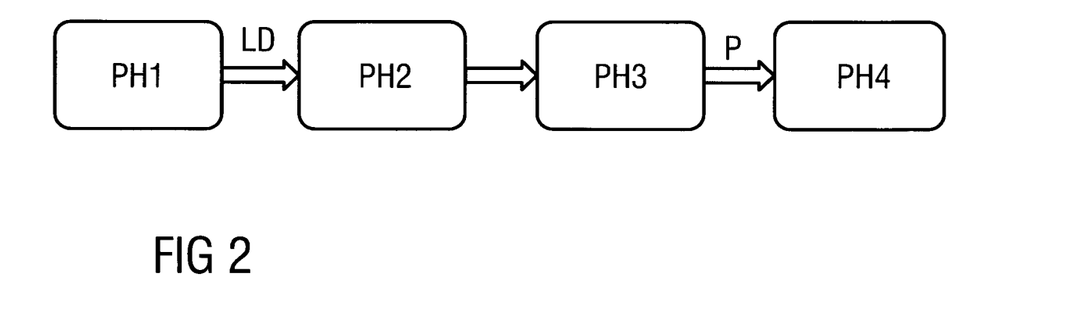
FIG. 2 is a schematic view of a sequence of a method for determining control parameters for light sources of a vehicle head light and of a method for controlling the light sources.
Figure 4:
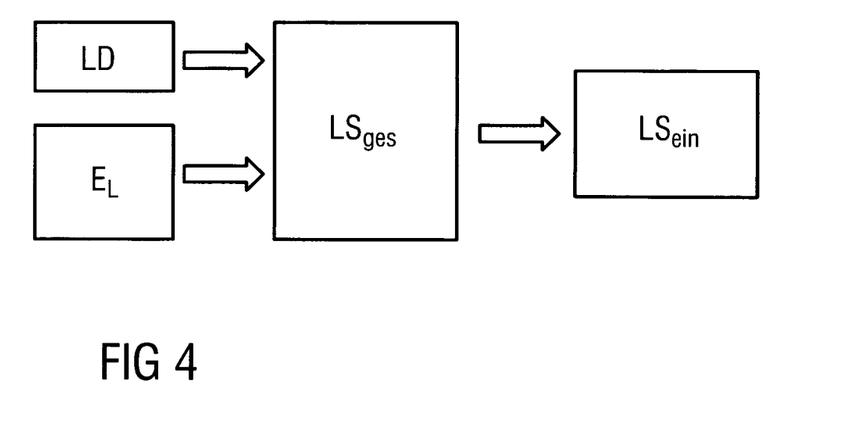
FIG. 4 is a schematic view of a sequence of detecting individual target light intensities for individual light sources of a vehicle headlight.

FIG. 2 shows a sequence of a possible embodiment of a method according to the invention for determining control parameters P for light sources 1.1 to 1.$n$, shown in more detail in FIG. 4, of a vehicle headlight 1 and of a possible embodiment of a method according to the invention for controlling the light sources 1.1 to 1.$n$.

The method for determining the control parameters P comprises three phases PH1 to PH3, a light distribution LV which is to be produced by the vehicle headlight 1 and is shown in more detail in FIG. 2 and the light data LD describing the light distribution LV being detected in a first phase PH1. The light distribution LV is detected universally for a plurality of vehicle headlights 1 and also in the vehicles 2 shown in more detail in FIG. 3.

Figure 3:
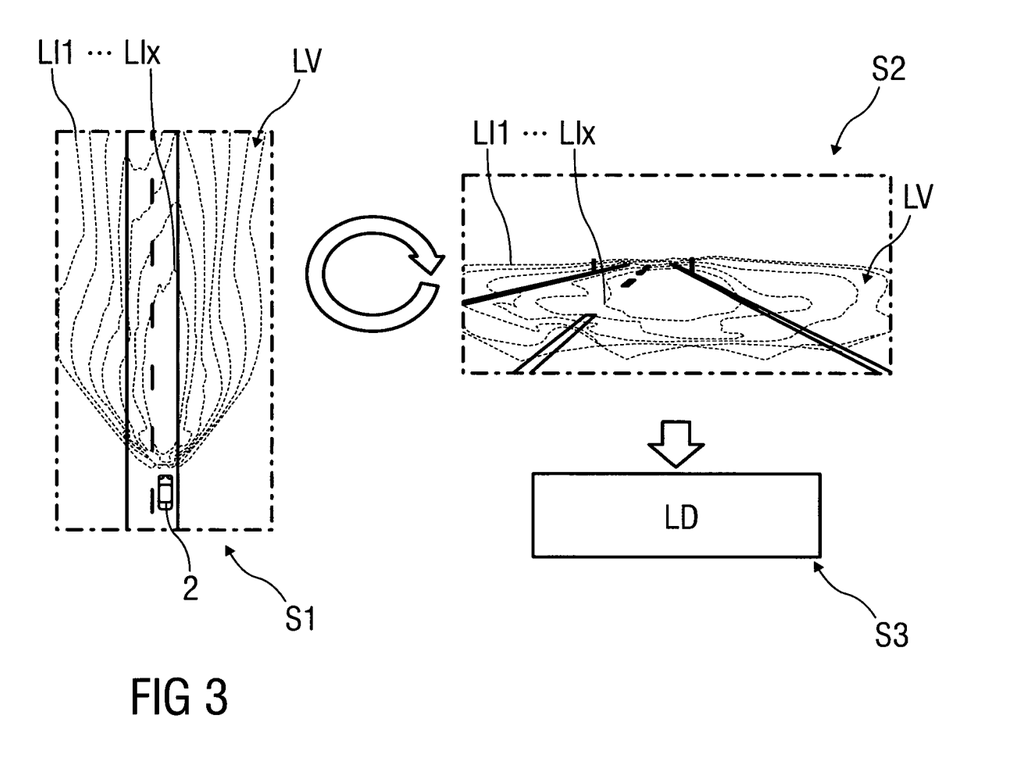
FIG. 3 is a schematic view of a sequence of detecting light data describing a light distribution.

In a second phase PH2 of the method for determining the control parameters P, an overall target light intensity $LS_{ges}$, shown in more detail in FIG. 3, of all the light sources 1.1 to 1.$n$ and an individual target light intensity $LS_{ein}$ for each individual light source 1.1 to 1.$n$ of the vehicle headlight 1 are detected based on the light data LD and based on geometric and optical properties $E_L$ of the light sources 1.1 to 1.$n$.

In a third phase PH3 of the method for determining the control parameters P, control parameters P are detected for each light source 1.1 to 1.$n$ of the vehicle headlight 1 based on the individual target light intensities $LS_{ein}$ and stored headlight data SD describing geometric and optical properties of the vehicle headlight 1, such that the vehicle headlight 1 produces the light distribution LV described by means of the light data LD.

In a phase PH4 of the method for controlling the light sources 1.1 to 1.$n$ of the vehicle headlight 1, the light sources 1.1 to 1.$n$ are controlled by the control parameters P.

FIG. 3 is a schematic view of detection of the light data LD carried out in a possible embodiment of the first phase PH1 of the method for determining the control parameters P.

This detection takes place in particular offline, i.e., outside the vehicle 2, and universally for a plurality of vehicle headlights 1 having different geometric and optical properties and a plurality of different vehicles 2.

In this case, a light distribution LV is in particular first produced on a road surface in a first step S1. The light distribution LV comprises a plurality of regions having different brightnesses and lines LI1 to LIx of identical lighting intensity, i.e., so-called isolux lines. Subsequently, in a second step S2, automatic and/or manual adaptation of the brightnesses is carried out in the regions until a light distribution LV that is considered to be ideal is produced. In addition, light data LD are produced in a third step S3, which describe this ideal light distribution LV.

FIG. 4 is a schematic view of detection of the overall target light intensity $LS_{ges}$ of all the light sources 1.1 to 1.$n$ and of the individual target light intensity $LS_{ein}$ for each individual light source 1.1 to 1.$n$ of the vehicle headlight 1 which is carried out in a possible embodiment of the second phase PH2.

This detection takes place based on the light data LD detected offline in the first phase PH1 and based on the geometric and optical properties $E_L$ of all the available light sources 1.1 to 1.$n$. In this case, detection is carried out offline or online, i.e., in the vehicle 2, and irrespective of light sources 1.1 to 1.$n$ installed individually in the vehicle headlight 1.

Figure 5:
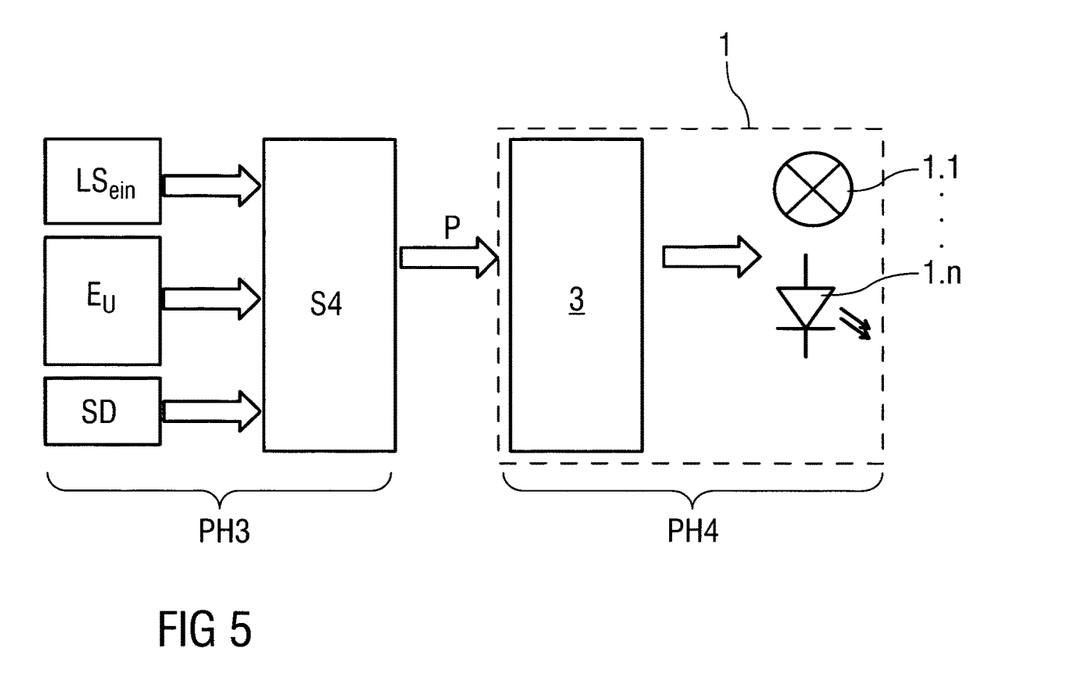
FIG. 5 is a schematic view of a sequence of detecting control parameters for light sources of a vehicle headlight and controlling the light sources.

FIG. 5 is a schematic view of detection of the control parameters P, which is carried out in a possible embodiment of the third phase PH3 of the method for determining the control parameters P and a possible embodiment of phase PH4 of the method for controlling the light sources 1.1 to 1.$n$.

In the third phase PH3, in a step S4, control parameters P for controlling the light sources 1.1 to 1.$n$ are detected based on the individual target light intensities $LS_{ein}$ for each individual light source 1.1 to 1.$n$ of the vehicle headlight 1, based on properties $E_U$ of the vehicle surroundings and/or of a road surface, and based on headlight data SD describing geometric and optical properties of the vehicle headlight 1.

In this case, properties $E_U$ of the vehicle surroundings and/or of the road surface comprise, for example, information regarding ambient brightness, precipitation and the condition of the road surface, in particular regarding scattering and reflection properties of the road surface which result from the material itself and deposits and/or precipitation thereon. The properties $E_U$ of the vehicle surroundings and/or of the road surface are detected, in particular, by at least one on-board sensor, for example a camera and/or a rain sensor.

The headlight data SD also comprise, in particular, classification of all the light sources 1.1 to 1.$n$, which is also known as binning.

In this case, pulse width modulation parameters, which are designed as binary code, in particular are determined as control parameters P.

In phase PH4 of the method for controlling the light sources 1.1 to 1.$n$, drivers 3 for the light sources 1.1 to 1.$n$, which can comprise in particular LEDs, but also lightbulbs, laser light sources and/or gas discharge lamps, are actuated by means of the control parameters P such that the vehicle headlight 1 produces the light distribution described by means of the light data LD.

Figure 6:
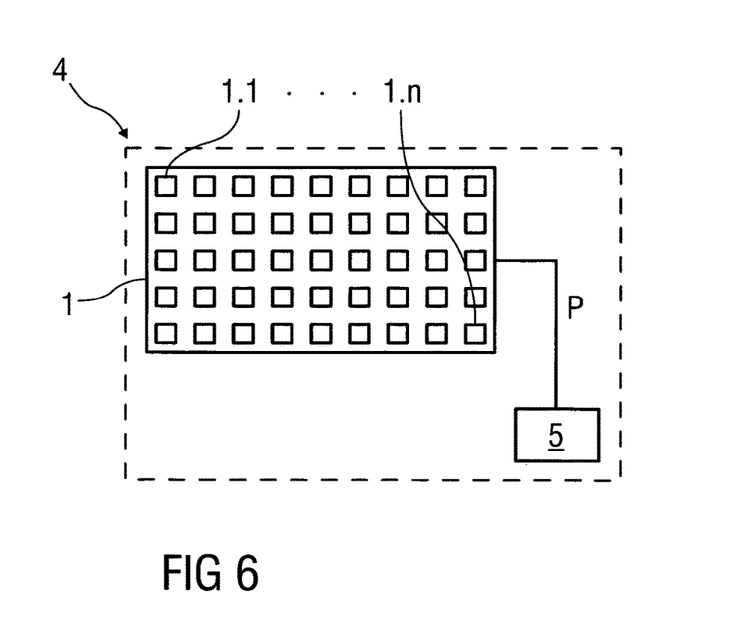
FIG. 6 is a schematic view of a first embodiment of a vehicle headlight system.

FIG. 6 shows a possible first embodiment of a vehicle headlight system 4 according to the invention for the vehicle 2, the vehicle headlight system 4 comprising at least one vehicle headlight 1 having a plurality of light sources 1.1 to 1.$n$ and at least one control unit 5 for controlling the vehicle headlight 1.

In the embodiment shown, the vehicle headlight 1 is designed as a so-called LED headlight and comprises a plurality of light sources 1.1 to 1.$n$ arranged adjacently and one above the other in a so-called array, which light sources are designed as LEDs. In embodiments not shown in more detail, the light sources 1.1 to 1.$n$ can alternatively or additionally also comprise other light sources, such as lightbulbs, laser light sources and/or gas discharge lamps. The light sources 1.1 to 1.$n$ can be actuated individually or in groups, irrespective of their design.

The control unit 5 is configured to carry out the described second and third phases PH2, PH3 of the method for determining the control parameters P for the light sources 1.1 to 1.$n$ of the vehicle headlight 1 and phase PH4 of the method for controlling the light sources 1.1 to 1.$n$ of the vehicle headlight 1.

Figure 7:
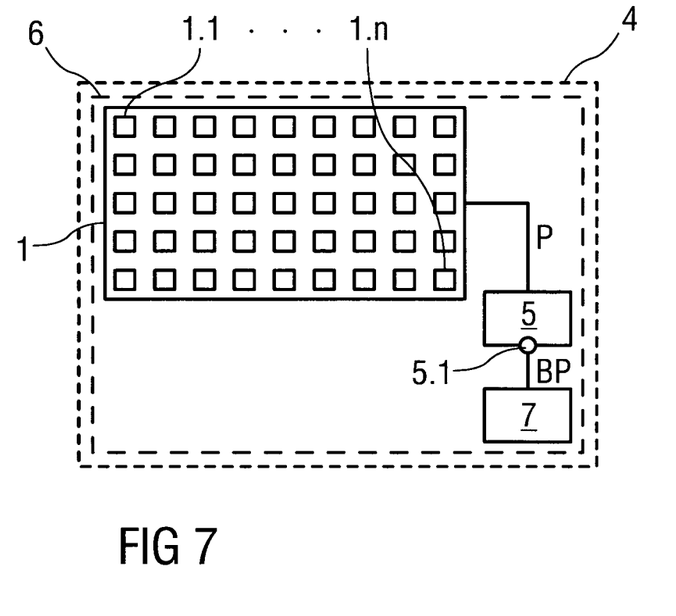
FIG. 7 is a schematic view of a second embodiment of a vehicle headlight system.

FIG. 7 shows a possible second embodiment of a vehicle headlight system 4 according to the invention for the vehicle 2, which system comprises the device 6 according to FIG. 1, in contrast to the first embodiment shown in FIG. 6.

In addition, the control unit 5 may also be configured to carry out the described second and third phases PH2, PH3 of the method for determining the control parameters P for the light sources 1.1 to 1.$n$ of the vehicle headlight 1 and phase PH4 of the method for controlling the light sources 1.1 to 1.$n$ of the vehicle headlight 1.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for adjusting a light distribution of a vehicle headlight having a plurality of light sources, the method comprising:
   receiving user-specified parameters for an illumination distribution of the light distribution of the headlight, wherein the illumination distribution specifies a desired light intensity for different positions within the light distribution of the headlight; and
   adjusting the illuminance distribution within the light distribution based on the user-specified parameters.

2. The method of claim 1, wherein the user-specified parameters are adjusted and/or detected during operation of the headlight.

3. The method of claim 1, wherein the receipt of user-specified parameters involves simulating the light distribution on a screen.

4. The method of claim 1, wherein light intensities of individual light sources of the plurality of light sources or groups of light sources of the plurality of light sources is adjusted based on the user-specified parameters.

5. A device for adjusting a light distribution of at least one vehicle headlight, the device comprising:
   at least one control unit configured to adjust the light distribution, wherein
      the at least one headlight comprises a plurality of light sources,
      the at least one control unit comprises an interface, which is configured to transmit user-specified parameters to the control unit, and
      the user-specified parameters are provided for an illumination distribution of the light distribution of the headlight, wherein the illumination distribution specifies a desired light intensity for different positions within the light distribution of the headlight.

6. The device of claim 5, wherein an input device is coupled to the interface.

7. The device of claim 6, wherein the input device is a touch-sensitive screen.

8. The device of claim 6, wherein the input device is a turn-press-pull-push switch.

9. The device of claim 6, wherein the input device is a mobile terminal.

10. A method for determining control parameters for light sources of a vehicle headlight, the method comprising:
    detecting at least one light distribution to be produced by the vehicle headlight, wherein the at least one light distribution is based on user-specified parameters for an illumination distribution of the light distribution of the headlight, wherein the illumination distribution specifies a desired light intensity for different positions within the light distribution of the headlight;
    producing light data describing the light distribution;
    detecting, based on the light data and based on geometric and optical properties of the light sources, an overall target light intensity of all the light sources and an individual target light intensity for each individual light source of the light sources;
    feeding the individual light intensities to a control unit of the vehicle headlight;
    detecting, by the control unit, control parameters for each light source of the light sources of the vehicle headlight based on the individual target light intensities and stored headlight data describing geometric and optical properties of the vehicle headlight such that the vehicle headlight produces the light distribution described by the light data.

11. The method of claim 10, wherein pulse width modulation parameters are determined as control parameters.

12. The method of claim 10, wherein the determination of the control parameters accounts for properties of vehicle surroundings and/or of a road surface.

13. The method of claim 12, wherein the properties of the vehicle surroundings and/or of a road surface are detected by at least one on-board sensor.

14. A method for controlling light sources of a vehicle headlight, the method comprising:

determining, by a control unit of the vehicle headlight, a light distribution to be produced by the vehicle headlight and light data describing the light distribution to be produced by the vehicle headlight, wherein the light distribution is based on user-specified parameters for an illumination distribution of the light distribution of the headlight, wherein the illumination distribution specifies a desired light intensity for different positions within the light distribution of the headlight;

determining, by the control unit, an overall target light intensity of all of the light sources and an individual target light intensity for each individual light source of the light sources based on the light data and geometric and optical properties of the light sources;

detecting, by the control unit, control parameters for each of the light sources based on the individual target light intensities and stored headlight data describing geometric and optical properties of the vehicle headlight; and controlling, by the control unit based on the control parameters, the light sources to produce the light distribution described by the light data.

15. The method of claim 14, wherein the control parameters comprise pulse width modulation parameters.

16. The method of claim 14, wherein the determination of the control parameters account for properties of vehicle surroundings and/or of a road surface.

17. A vehicle headlight system, comprising:
at least one vehicle headlight having a plurality of light sources; and
at least one control unit for controlling the vehicle headlight, wherein the at least one control unit is configured to
determine a light distribution to be produced by the vehicle headlight and light data describing the light distribution to be produced by the vehicle headlight, wherein the light distribution is based on user-specified parameters for an illumination distribution of the light distribution of the headlight, wherein the illumination distribution specifies a desired light intensity for different positions within the light distribution of the headlight;

determine an overall target light intensity of all of the light sources and an individual target light intensity for each individual light source of the light sources based on the light data and geometric and optical properties of the light sources;

detect control parameters for each of the light sources based on the individual target light intensities and stored headlight data describing geometric and optical properties of the vehicle headlight; and control, based on the control parameters, the light sources to produce the light distribution described by the light data.

18. The vehicle headlight system of claim 17, wherein the light sources are individually controlled or controlled in groups.

19. The vehicle headlight system of claim 17, wherein a plurality of light sources are arranged adjacently and/or one above the other.

* * * * *